US012366108B2

(12) United States Patent
Gäbele

(10) Patent No.: US 12,366,108 B2
(45) Date of Patent: Jul. 22, 2025

(54) INSULATING GLASS ELEMENT AND SAUNA CABIN COMPRISING THE INSULATING GLASS ELEMENT

(71) Applicant: Klafs GmbH, Schwäbisch Hall (DE)

(72) Inventor: Markus Gäbele, Schwäbisch Hall (DE)

(73) Assignee: Klafs GmbH (DE)

( * ) Notice: Subject to any disclaimer, the term of this patent is extended or adjusted under 35 U.S.C. 154(b) by 160 days.

(21) Appl. No.: 18/376,962

(22) Filed: Oct. 5, 2023

(65) Prior Publication Data

US 2024/0376766 A1 Nov. 14, 2024

(30) Foreign Application Priority Data

May 9, 2023 (DE) ........................ 202023102497.1

(51) Int. Cl.
*A61H 33/06* (2006.01)
*E06B 3/02* (2006.01)
*E06B 3/663* (2006.01)

(52) U.S. Cl.
CPC ....... *E06B 3/66342* (2013.01); *A61H 33/066* (2013.01); *E06B 3/02* (2013.01); *E06B 3/66319* (2013.01)

(58) Field of Classification Search
CPC .... E06B 3/66342; E06B 3/66352; E06B 3/02; E06B 3/66319; A61H 33/066
USPC .............................................................. 4/524
See application file for complete search history.

(56) References Cited

U.S. PATENT DOCUMENTS

| | | | | |
|---|---|---|---|---|
| 3,868,805 | A * | 3/1975 | Battersby ............ | E06B 3/66342 52/402 |
| 2021/0017805 | A1* | 1/2021 | Shimizu ................ | E06B 3/6612 |
| 2022/0170313 | A1* | 6/2022 | Ishibashi ................ | C03C 27/06 |
| 2022/0228425 | A1* | 7/2022 | Gargiulo ................ | C03B 27/00 |
| 2023/0015006 | A1* | 1/2023 | Lazebnikov .......... | E06B 3/5427 |

FOREIGN PATENT DOCUMENTS

DE 9206081 U1 9/1992

* cited by examiner

*Primary Examiner* — Huyen D Le
(74) *Attorney, Agent, or Firm* — Dickinson Wright PLLC

(57) ABSTRACT

The insulating glass element is constructed for doors, windows and fixed glass fronts. The insulating glass element includes a first glass pane and a second glass pane that is spaced from the first glass pane by a circumferential spacer element in an edge region. The glass panes each have a continuous recess; a first circumferential sealing element in the edge region of the glass panes, which seals the volume enclosed between the glass panes and the spacer element in the area of the spacer element in a gas-tight manner against the surroundings; and an insert introduced between the glass panes. The insert has a recess and is provided with a centering element that interacts with a recess of a glass pane for positioning the insert relative to the glass panes.

28 Claims, 4 Drawing Sheets

INSULATING GLASS ELEMENT AND SAUNA CABIN COMPRISING THE INSULATING GLASS ELEMENT

CROSS-REFERENCE TO RELATED APPLICATION

This application claims priority to and the benefit of German Patent Application No. 202023102497.1, filed on May 9, 2023, and entitled "INSULATING GLASS ELEMENT AND SAUNA CABIN COMPRISING THE INSULATING GLASS ELEMENT," which is herein incorporated by reference.

BACKGROUND

1. Field

The present disclosure relates to an insulating glass element.

2. Related Art

Generic insulating glass elements are used, for example, for glass fronts in sau-nas, however, they can also be used as facade elements in buildings. The most important property for all areas of application is thermal insulation, and there is a strong desire to improve this ever further from an economic point of view. From the prior art, a plurality of possibilities is known to improve the thermal insulation properties of glass elements, alt-hough these are often opposed to a certain aesthetic demand.

An insulating glass element according to the preamble of claim 1 is known, for example, from DE 92 06 081 U1. This shows an insulating glass element consisting of two glass panes with a circumferential spacer and a standard seal. The described glass panes also have bores for a screw connection, wherein an insert is provided in the area of the bores between the glass panes, which also has a bore and is screwed together with the glass panes.

In the manufacturing process of such an insulating glass element, the individual glass elements must be aligned with each other such that the corresponding bores are coaxial with each other, wherein in addition the bore of the insert should also be arranged as coaxial as possible with the bores of the glass elements. The configuration of the arrangement of inserts and glass panes in DE 92 06 081 U1 is not optimal in this respect, since no possibility is provided for aligning or positioning the elements relative to one another, which results in increased manufacturing effort.

SUMMARY

The present disclosure thus has as its object to provide an insulating glass element of the generic type which reduces the manufacturing effort.

The problem the insert having a centering element which interacts with a recess of a glass pane for positioning the insert relative to the glass panes.

The solution according to the disclosure has the advantage that the insert and the glass pane are centered relative to each other, which considerably simplifies the align-ment of the insert to the glass panes and thus the manufacturing process of a generic insulating glass element. In addition, insulating glass elements according to the disclosure are particularly suitable for thermal insulation.

Preferred embodiments of the present disclosure are the subject of the sub-claims.

In the present context, substantially congruent and substantially coaxial means that the corresponding central axes have an angular offset of less than 10°, preferably of less than 5° and particularly preferably of less than 1°, and that the distance between the corresponding central axes does not exceed a value of 10%, preferably of 5% and particularly preferably of 1% of the extent of the cross-sectional area.

The glass panes of the insulating glass element according to the disclosure are aligned essentially parallel to each other. Any deviation in parallelism results primarily from the manufacturing tolerances of the spacer element and should not exceed an angle of 1°.

According to a particularly preferred embodiment of the present disclosure, the recess of the first glass pane and the recess of the second glass pane are aligned substantially congruently with one another in the normal direction to the glass panes. However, it is also conceivable that the recesses are not aligned congruently with one another and that their cross-sectional areas only partially overlap.

According to a further preferred embodiment of the present disclosure, the recess of the insert is continuous and has a round cross-section. For centering and align-ment of the screw connection, it is advantageous if the recess of the insert has a round cross-section, however it is also conceivable that the recess has, for example, a rectan-gular cross-section.

According to a preferred embodiment of the present disclosure, the recess of at least one of the glass panes is a bore and the bore is aligned substantially coaxially with the recess of the insert.

A particularly preferred embodiment of the present disclosure is provided when the recess of both glass panes is a bore, wherein the bores are aligned substantially coaxially with each other. The configuration of the recess of the glass panes as a bore facilitates their manufacture, wherein the diameter of the bore is dependent on the fastening means used for fastening the glass panes.

According to another preferred embodiment of the present disclosure, the centering element of the insert comprises an outer contour and the outer contour has a substantially circular cross-section, wherein the outer contour of the centering element is aligned substantially congruently with the recess of the insert and the outer contour of the centering element interacts with the bore of a glass pane for positioning the insert relative to the glass panes. However, it is also conceivable that the outer contour of the centering element is configured in another shape that is suitable for centering the insert relative to the bore of the glass pane. For example, the centering element may have an angular outer contour, wherein the positioning of the insert is effected by the interaction of the corners with the bore of the glass pane. It is also conceivable that the centering element comprises several centering elements which are distributed uniformly over the circumfer-ence of the recess of the insert and interact with the bore of the glass pane.

Even better centering and positioning of the insert can be achieved by each of the glass panes having two bores and the insert comprising two recesses, and the two recesses each having centering elements. Of course, it is also conceivable that the glass panes have more than two bores for the purpose described.

If an insert comprises several centering elements, these can be provided on the same side of the insert, wherein the centering and positioning of the insert then only takes place relative to one glass pane. It is also conceivable that centering elements are provided on both sides of the insert and that these then interact with the recesses of both glass panes.

Another function of the insert is that the insulating glass element can be screwed to another element in the area of the insert. The insert stabilizes the screw connection, which enables the screw connection to bear higher loads. The screw connection can ex-ist, for example, with a hinge. However, it is also conceivable that a door handle or a window handle is fastened in the area of the insert.

According to a further preferred embodiment of the present disclosure, the insert is provided within the volume enclosed by the spacer element and the glass panes. However, it is also conceivable to arrange the insert outside the volume enclosed by the spacer element and the glass panes.

According to a further preferred embodiment of the present disclosure, the insulating glass element has a second sealing element which seals the volume enclosed by the spacer element and the glass panes in a gas-tight manner from the surroundings in the area of the insert.

A particularly preferred embodiment of the present disclosure is provided when the second sealing element extends over the entire contact area of the insert and the glass pane. In other words, the second sealing element is advantageously positioned between the insert and the glass panes and uses the largest possible contact area for sealing. However, it is also conceivable that the second sealing element is arranged over part of the contact area of the insert with the glass pane.

According to a further preferred embodiment of the present disclosure, the second sealing element is glued onto the insert. Gluing the second sealing element to the insert has the advantage for manufacturing that the two elements are already firmly aligned with each other. However, it is also conceivable that the second sealing element is clamped between the insert and the glass pane. For this purpose, the insert can, for example, have a further recess that interacts with the second sealing element such that the second sealing element is positioned or even fixed in a defined manner on the insert.

According to a particularly preferred embodiment of the present disclosure, the spacer element is bonded to one glass pane. However, it is also conceivable that the spacer element is bonded to both glass panes.

According to another preferred embodiment of the present disclosure, the first sealing element is a butyl seal and is provided outside the volume enclosed by the spacer element and the glass panes. Advantageously, the butyl seal is provided over the entire height, that is, over the entire distance between the two glass panes.

According to a particularly preferred embodiment of the present disclosure, the glass edges are polished all around.

According to a further preferred embodiment of the present disclosure, the glass edges are ground to a matte finish all around.

According to a further preferred embodiment of the present disclosure, the outer edges of the glass panes are sealed. The form in which the glass edges of the insulating glass element according to the disclosure are processed depends not least on the place of use and on the aesthetic requirements placed on the glass edges.

According to a further preferred embodiment of the present disclosure, the material of the insert is a plastic. Plastic is an inexpensive and reliable material, however, it is also conceivable that the insert is made of aluminum or another lightweight metal that is inexpensive to manufacture.

According to another preferred embodiment of the present disclosure, the insulating glass element comprises a ferromagnetic component. It is preferred that the ferromagnetic component is mounted outside the volume enclosed by the spacer element and is bonded to one of the glass panes. For example, the ferromagnetic component can interact with a magnet mounted in a counterpart to the insulating glass element, such as a door frame. It is conceivable that the magnetic connection forms a reed contact by means of which an unlocked door or an unlocked window is detected. Alternatively, the magnetic connection can be adapted such that a door that is not fully closed or a window that is not fully closed is closed. This application is conceivable, for example, in a sauna door where standing open should be avoided at all costs for the sake of energy-efficient operation.

According to a further preferred embodiment of the present disclosure, the distance between the glass panes is 2-12 mm. Theoretically, a greater distance between the glass panes would also be conceivable, for example in the case of particularly thickly configured glass panes.

According to a further preferred embodiment of the present disclosure, the insulating glass element is frameless. It is of course conceivable that the insulating glass element according to the disclosure can also be configured with a frame.

According to a particularly preferred embodiment of the present disclosure, at least one of the glass panes is configured such that it can be rendered in an opaque state. For this purpose, for example, a coating with an electrochromic or with a thermochromic material can be provided, wherein the glass pane becomes opaque by the application of an electrical voltage or by a change in temperature.

The present disclosure also includes a sauna cabin comprising an insulating glass element according to the preceding description.

According to a particularly preferred embodiment of the sauna cabin, the insulating glass element is a door.

According to another preferred embodiment of the sauna cabin, the insulating glass element is a window.

According to another preferred embodiment of the sauna cabin, the insulating glass element is a fixed glass front or part of a fixed glass front.

According to a particularly preferred embodiment of the present disclosure, the sauna cabin comprises a first insulating glass element and a second insulating glass element, wherein the first insulating glass element is fixed and wherein the second insulating glass element is a door.

According to a further particularly preferred embodiment of the present disclosure, the first and second insulating glass elements are connected to one another by means of a rotatable joint. It is also conceivable that the second insulating glass element configured as a door is framed by fixed insulating glass elements and thus a continuous glass front can be created as a room boundary.

According to a further preferred embodiment of the present disclosure, the first glass pane forms a wall inside the sauna cabin and the second glass pane forms an outer boundary of the sauna cabin, wherein the centering element interacts with the first glass pane. However, it is also conceivable that the centering element interacts with the second glass pane.

BRIEF DESCRIPTION OF THE DRAWINGS

One embodiment of the present disclosure is explained in more detail below with reference to drawings.

In the following explanations, the same parts are indicated by the same reference signs. Insofar as a Figure contains reference signs which are not discussed in detail in the associated Figure description, reference is made to the preceding or subsequent Figure descriptions.

DETAILED DESCRIPTION OF THE ENABLING EMBODIMENT

Figure 1B:
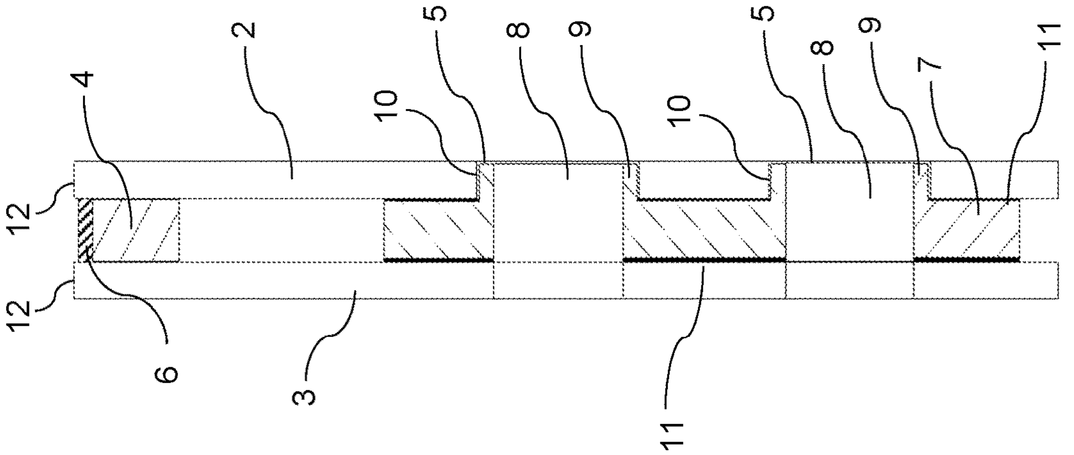
FIG. 1B shows a section through the insulating glass element according to the disclosure along the section line A-A marked in FIG. 1A.
Figure 1A:
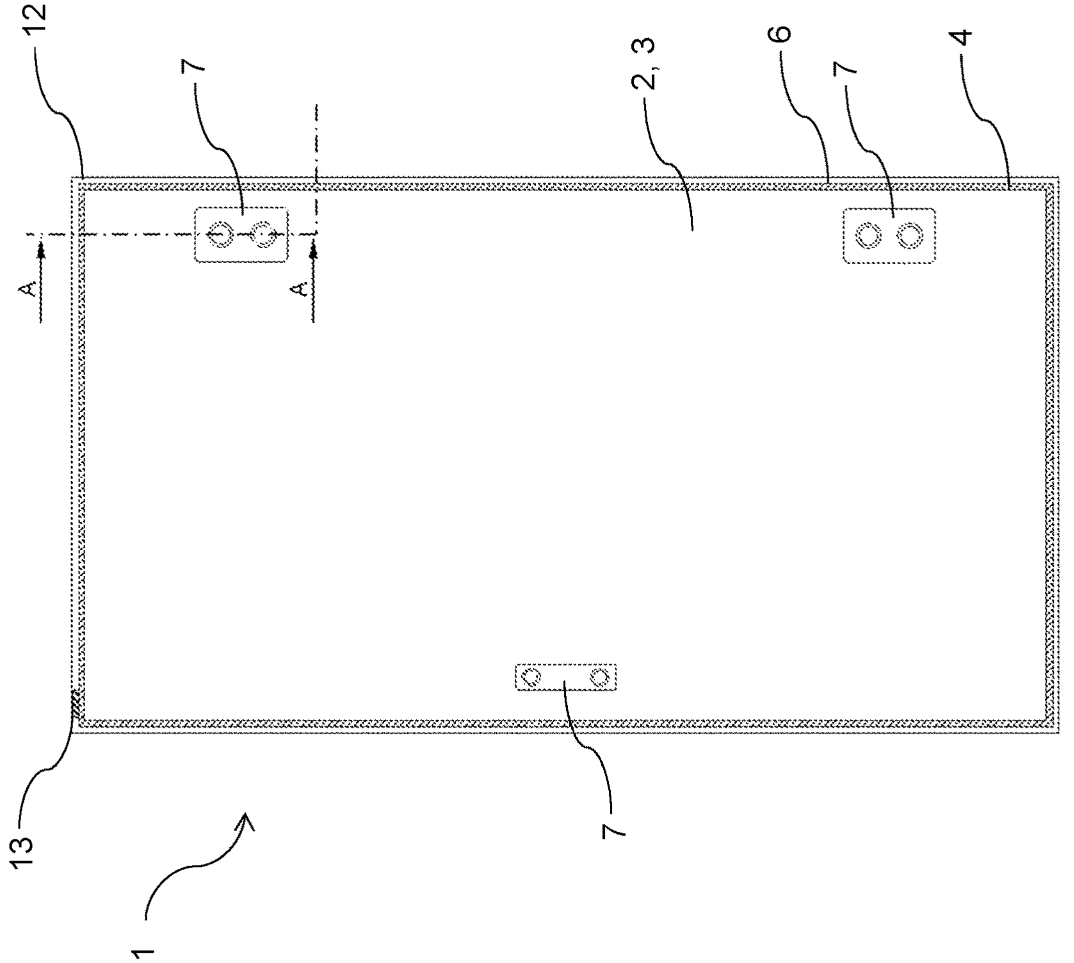
FIG. 1A shows an embodiment of the insulating glass element according to the disclosure.

FIG. 1A shows an insulating glass element 1 according to the disclosure, which is configured as a door. The first glass pane 2 and the second glass pane 3 are spaced apart by the spacer element 4. The volume enclosed between the glass panes 2, 3 and the spacer element 4 is sealed in a gas-tight manner against the surroundings by the first sealing element 6. The first sealing element 6 is not shown in detail in FIG. 1A, however in FIG. 1B, it can be clearly seen that the first sealing element 6 is provided on that side of the spacer element 4 which does not delimit the volume enclosed by the glass panes 2, 3 and the spacer element 4. The first sealing element 6 is provided over the entire height of the spacer element 4 and consequently occupies its entire height or the complete distance between the first glass pane 2 and the second glass pane 3. Preferably, the first sealing element 6 is configured as a butyl seal.

The insulating glass element 1 shown in FIG. 1A comprises three inserts 7, wherein the insert 7 on the left in the Figure provides a door handle in the area of the screw connection and wherein the inserts 7 on the right in the Figure are used for screwing hinges. It can also be readily seen that all three inserts 7 shown have two recesses 8, wherein the recesses 8 each comprise a centering element 9. The insulating glass element 1 further comprises a ferromagnetic component 13 in the upper area, outside the volume enclosed by the spacer element 4 and the two glass panes 2, 3.

FIG. 1B shows section A-A in detail. It can be readily seen that the glass panes 2, 3 each have two recesses 5 and that the insert 7 has two recesses 8 and two centering elements 9. Both the recesses 8 of the insert 7 and the recesses 5 of the glass panes 2, 3 are configured as bores, wherein in each case a bore 5 of a glass pane 2, 3 is aligned coaxially with a recess 8 of the insert 7 and the centering element 9. The centering element 9 is configured with a round cross-sectional shape, wherein the diameter is adapted such that the outer contour can interact with the bore 5 of the glass pane 2, 3, for centering the insert 7 relative to the glass pane 2, 3.

The insert 7 is arranged between the glass panes 2, 3, wherein a second sealing element 11 is provided between the respective contact areas, which seals the volume enclosed by the glass panes 2, 3 and the spacer element 4 in a gas-tight manner from the surroundings.

Figure 2B:
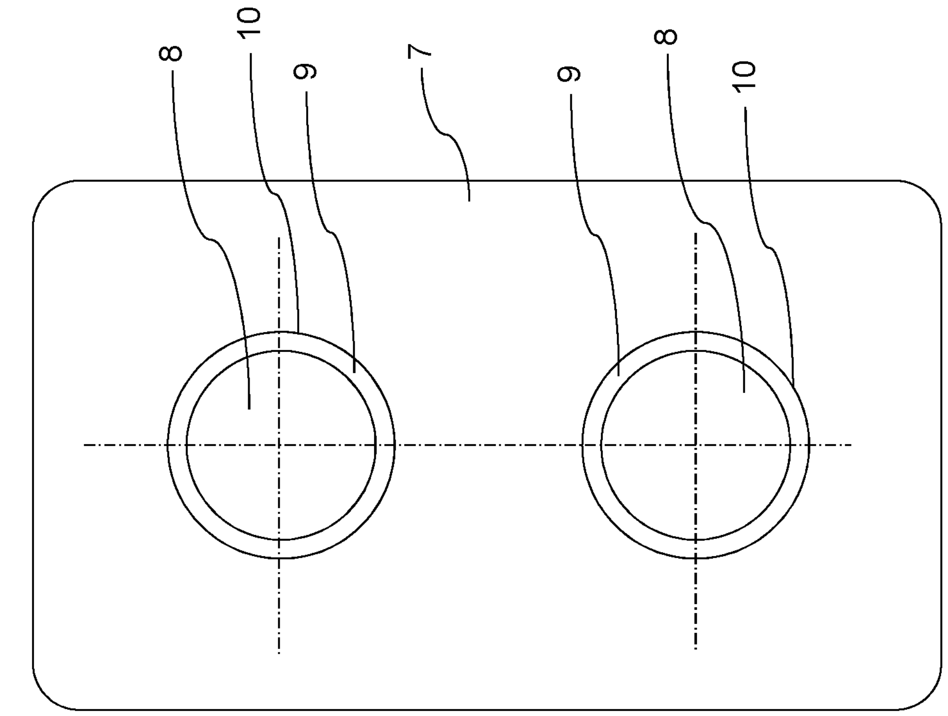
FIG. 2B shows the top view of the insert from FIG. 2A.
Figure 2A:
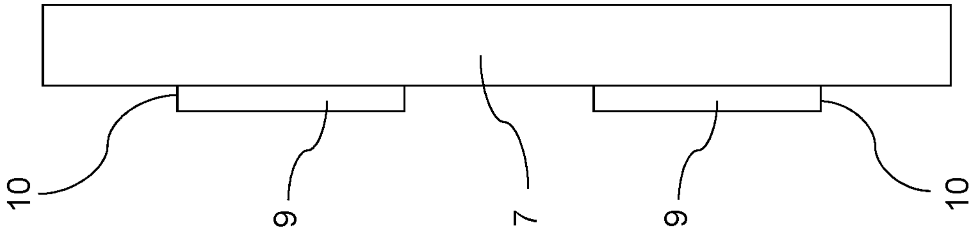
FIG. 2A shows the side view of the insert of the insulating glass element according to the disclosure from FIGS. 1A and 1B.

FIG. 2B shows the insert 7 of FIG. 1B in a top view and FIG. 2A shows the same insert 7 in a side view. In this illustration, the round cross-sectional shape of the centering element 9 with its outer contour 10 can be readily seen.

Figure 3:
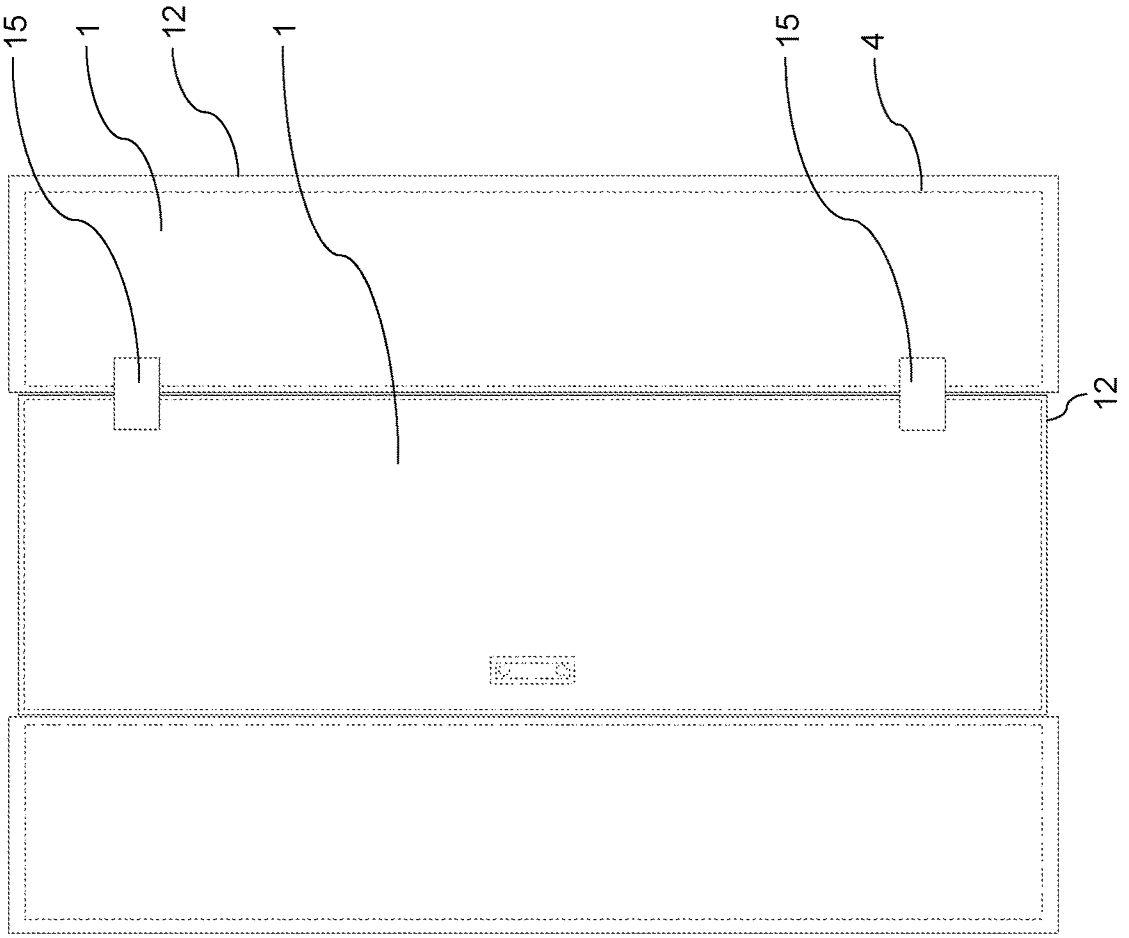
FIG. 3 shows a glass front with the insulating glass element according to the disclosure of FIGS. 1A and 1B, and FIG. 4 schematically shows a sauna cabin according to the disclosure with the glass front from FIG. 3.

FIG. 3 shows a possible arrangement of insulating glass elements 1 according to the disclosure, wherein the insulating glass element 1 on the right in the illustration is configured as fixed glazing, while the insulating glass element 1 on the left in the illustration is configured as a door. Both insulating glass elements 1 are connected to each other via a rotatable joint 15. The screw connection of the hinged joint 15 is concealed in FIG. 3 by a schematically shown cover.

Figure 4:
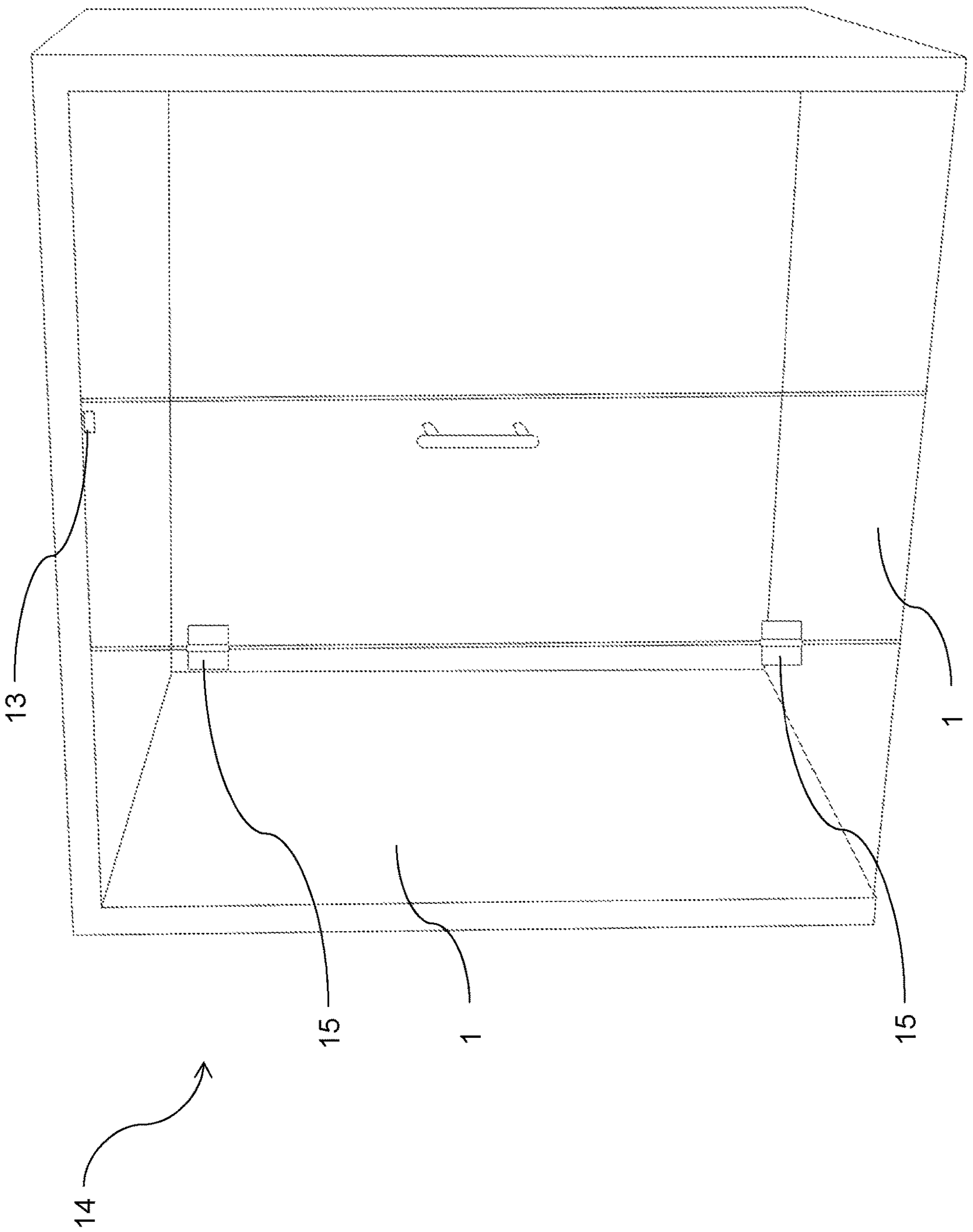

FIG. 4 schematically shows a sauna cabin 14 comprising two insulating glass elements 1 according to the disclosure. The insulating glass element 1 on the left in the illustration is configured as fixed glazing, wherein the insulating glass element 1 according to the disclosure, which is configured as a door, is connected to it via the rotatable joint 15. The glass element on the right in the illustration completes the arrangement to form a continuous glass front, wherein the right glass element is configured as an insulating glass element, but not according to the disclosure.

The invention claimed is:

1. An insulating glass element for a door, a window or a fixed glass front, comprising a first glass pane and a second glass pane spaced apart from the first glass pane by a circumferential spacer element in the edge region, wherein the glass panes each have a continuous recess, a circumferential first sealing element in the edge region of the glass panes, which seals the volume enclosed between the glass panes and the spacer element in a gas-tight manner against the surroundings in the area of the spacer element, and an insert introduced between the glass panes, wherein the insert has a recess, and wherein the insert comprises a centering element interacting with a recess of a glass pane for positioning the insert relative to the glass panes.

2. The insulating glass element according to claim 1, wherein the recess of the first glass pane and the recess of the second glass pane are aligned substantially congruent to each other in the normal direction to the glass panes.

3. The insulating glass element according to claim 2, wherein the recess of the insert is continuous and has a round cross-section.

4. The insulating glass element according to claim 3, wherein the recess of at least one of the glass panes is a bore and the bore is aligned substantially coaxially with the recess of the insert.

5. The insulating glass element according to claim 4, wherein the recess of both glass panes is a bore, wherein the bores are aligned substantially coaxially with each other.

6. The insulating glass element according to claim 4, wherein the centering element of the insert comprises an outer contour and the outer contour has a substantially circular cross-section, wherein the outer contour of the centering element is aligned substantially congruently with the recess of the insert and the outer contour of the centering element interacts with the bore of a glass pane for positioning the insert relative to the glass panes.

7. The insulating glass element according to claim 1, wherein the insert is provided within the volume enclosed by the spacer element.

8. The insulating glass element according to according to claim 1, wherein the insulating glass element has a second sealing element which seals off the volume enclosed by the spacer element in a gas-tight manner from the surroundings in the area of the insert.

9. The insulating glass element according to claim 1, wherein the second sealing element extends over the entire contact area of the insert and the glass pane.

10. The insulating glass element according to claim 9, wherein the second sealing element is glued to the insert.

11. The insulating glass element according to claim 1, wherein the spacer element is bonded to a glass pane.

12. The insulating glass element according to claim 1, wherein the first sealing element is a butyl seal and is provided outside the volume enclosed by the spacer element.

13. The insulating glass element according to claim 1, wherein the glass edges of the glass panes are polished all around.

14. The insulating glass element according to claim 1, wherein the glass edges are ground to a matte finish all around.

15. The insulating glass element according to claim 1, wherein the glass edges are sealed.

16. The insulating glass element according to claim 1, wherein the material of the insert is a plastic.

17. The insulating glass element according to claim 1, wherein the insulating glass element comprises a ferromagnetic component.

18. The insulating glass element according to claim 17, wherein the ferromagnetic component is mounted outside the volume enclosed by the spacer element and is bonded to one of the glass panes.

19. The insulating glass element according to claim 1, wherein the distance between the glass panes is 2-12 mm.

20. The insulating glass element according to claim 1, wherein the insulating glass element is frameless.

21. The insulating glass element according to claim 1, wherein at least one of the glass panes is configured such that it can be rendered in an opaque state.

22. A sauna cabin comprising an insulating glass element constructed according to claim 1.

23. The sauna cabin according to claim 22, wherein the insulating glass element is a door.

24. The sauna cabin according to claim 22, wherein the insulating glass element is a window.

25. The sauna cabin according to claim 22, wherein the insulating glass element is a fixed glass front or part of a fixed glass front.

26. The sauna cabin according to claim 25, wherein the first and second insulating glass elements are connected to each other by means of a rotatable joint.

27. The sauna cabin according to claim 22, wherein the insulating glass element is a first insulating glass element that is fixedly installed in the sauna cabin and further including a second insulating glass element that is constructed according to claim 1 and is a door.

28. The sauna cabin according to claim 22, wherein the first glass pane forms a wall inside the sauna cabin and the second glass pane forms an outer boundary of the sauna cabin, and wherein the centering element interacts with the first glass pane.

* * * * *